No. 862,297. PATENTED AUG. 6, 1907.
J. W. THOMPSON.
KNIFE FOR STRIPPING AND CUTTING CANE.
APPLICATION FILED SEPT. 13, 1906.

Witnesses:

Inventor:
John W. Thompson

UNITED STATES PATENT OFFICE.

JOHN W. THOMPSON, OF COVINGTON COUNTY, MISSISSIPPI.

KNIFE FOR STRIPPING AND CUTTING CANE.

No. 862,297.     Specification of Letters Patent.     Patented Aug. 6, 1907.

Application filed September 13, 1906. Serial No. 334,553.

*To all whom it may concern:*

Be it known that I, JOHN W. THOMPSON, a citizen of the county of Covington, State of Mississippi, United States of America, have invented a new and useful Improvement in Knives for Stripping and Cutting Cane, of which the following is a specification.

My invention relates to hand operated knives for stripping and cutting cane, particularly sugar cane, and the object of the invention is to provide an implement of this character which is particularly simple in construction and highly efficient in use.

The invention includes the construction of article to be hereinafter described and particularly pointed out in the claims.

Figure 1:
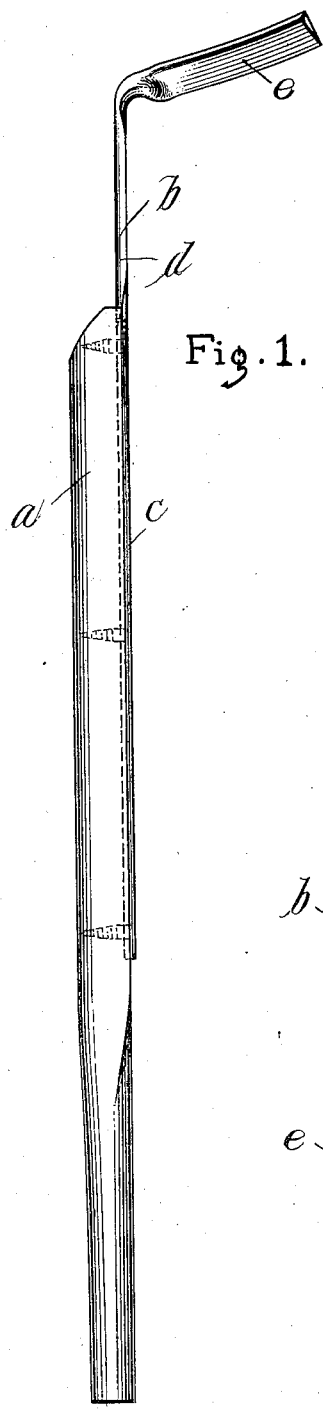
Figure 2:
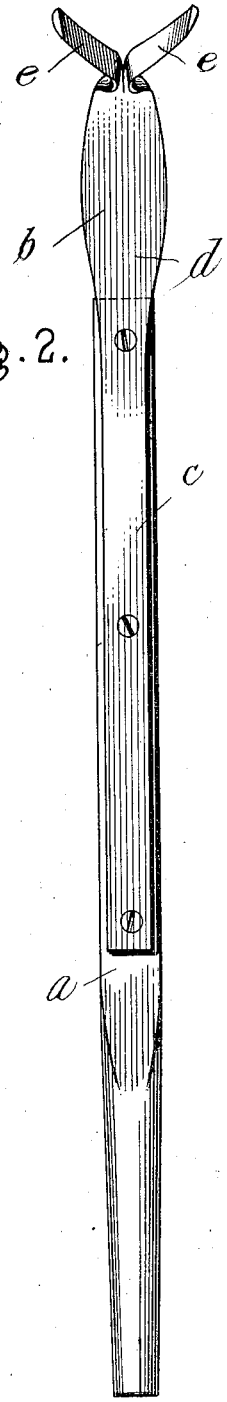
Figure 3:
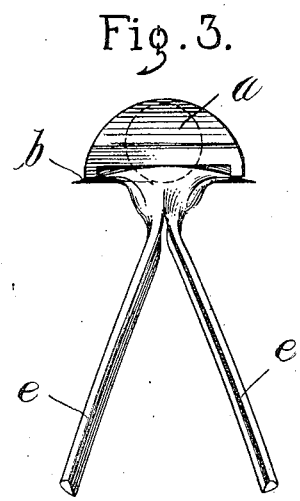

In the accompanying drawings which illustrate the invention Figure 1 is a side elevation of the knife. Fig. 2, a front elevation thereof and Fig. 3, a top plan view of the same.

The invention includes, generally, a handle, a knife blade secured thereto having cutting edges along the opposite sides thereof, and a bifurcated laterally extending end providing stripping blades.

In the accompanying drawings, the handle is designated $a$ and may be of any desired shape. The handle is preferably made of wood, is about two feet long and is preferably provided with a flat side, as shown.

The cutting blade is designated $b$ and is illustrated in the accompanying drawings as provided with an elongated shank $c$, secured to the flat side of the handle and is provided with a portion $d$ projecting beyond the end of the handle having its opposite side edges slightly bulged and sharpened to provide cutting edges. The portion $d$ terminates in a laterally extending bifurcated portion providing stripping blades $e$ $e$ having flat inner sides converging downwardly and outer sides beveled toward the lower edges of the blades to provide knife edges. As will be noted, the blades $e$ diverge from the portion $d$.

As will be understood, the blades $e$ are used in stripping the cane and the knife edges on the portion $c$ are employed for cutting the cane.

I claim:—

1. A combined cane cutting and stripping knife comprising, a handle and a blade having a shank portion secured to the handle and a part extending beyond the handle having its opposite edges sharpened to provide cutting edges, the latter portion terminating in a laterally extending bifurcated part providing stripping blades.

2. A combined cane cutter and stripper comprising a handle, and a blade having a part extending beyond the end of the handle with its opposite side edges sharpened, said part terminating in a fork portion, the tines of which extend laterally and diverge from the last named part, said tines having inner sides converging downwardly and outer sides beveled to form cutting edges along the lower edges of the tines.

In witness whereof I have signed my name in the presence of two witnesses this the 27th day of Oct., 1905.

J. W. THOMPSON.

Witnesses:
   G. H. MAYFIELD,
   W. N. CONLEY.